US012207273B2

(12) United States Patent
Ji et al.

(10) Patent No.: US 12,207,273 B2
(45) Date of Patent: Jan. 21, 2025

(54) TECHNIQUES FOR COMMUNICATING OVER CONFIGURED GRANT RESOURCES WITH HIGH ROUND TRIP TIMES

(71) Applicant: QUALCOMM Incorporated, San Diego, CA (US)

(72) Inventors: Lianghai Ji, San Diego, CA (US); Huilin Xu, Temecula, CA (US); Mohamad Sayed Hassan, Paris (FR); Liangping Ma, San Diego, CA (US); Jun Ma, San Diego, CA (US); Qiang Wu, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/668,933

(22) Filed: Feb. 10, 2022

(65) Prior Publication Data

US 2023/0254871 A1 Aug. 10, 2023

(51) Int. Cl.
*H04W 72/23* (2023.01)
*H04L 1/08* (2006.01)
*H04W 72/0446* (2023.01)

(52) U.S. Cl.
CPC ............... *H04W 72/23* (2023.01); *H04L 1/08* (2013.01); *H04W 72/0446* (2013.01)

(58) Field of Classification Search
CPC ............. H04W 72/23; H04W 72/0446; H04W 72/231; H04W 72/232; H04W 72/04; H04L 1/08
See application file for complete search history.

(56) References Cited

U.S. PATENT DOCUMENTS

2020/0106559 A1* 4/2020 Vilaipornsawai ..... H04L 1/1896
2021/0076409 A1* 3/2021 Goto ................. H04W 72/1268
2021/0144743 A1 5/2021 Rastegardoost et al.
(Continued)

FOREIGN PATENT DOCUMENTS

WO 2021/060301 4/2021

OTHER PUBLICATIONS

International Search Report and Written Opinion dated Mar. 17, 2023 from corresponding PCT Application No. PCT/US2022/080737.
(Continued)

*Primary Examiner* — Steven Hieu D Nguyen
(74) *Attorney, Agent, or Firm* — ArentFox Schiff LLP

(57) ABSTRACT

Aspects described herein relate to receiving, from a network node, a first transmission for configuring a configured grant, wherein the configured grant allocates one or more resources associated with an uplink transmission process having a transmission process identifier, obtaining a first indication that the network node uses a fallback downlink control information (DCI) format, and modifying, based at least in part on obtaining the first indication and the transmission process identifier, the uplink transmission process. Other aspects relate to configuring a device for modifying the uplink transmission process, receiving uplink communications based on the modified uplink transmission process, and/or the like.

29 Claims, 10 Drawing Sheets

(56) References Cited

U.S. PATENT DOCUMENTS

| | | | |
|---|---|---|---|
| 2023/0039872 A1* | 2/2023 | Khoshkholgh Dashtaki .............. H04W 72/1268 | |
| 2023/0388952 A1* | 11/2023 | Khoshkholgh Dashtaki .............. H04B 7/18513 | |
| 2024/0121060 A1* | 4/2024 | Prasad .................. H04L 5/0051 | |

OTHER PUBLICATIONS

3rd Generation Partnership Project; Technical Specification Group Radio Access Network; NR; Medium Access Control (MAC) protocol specification (Release 16), 3GPP Standard; Technical Specification; 3GPP TS 38.321, 3rd Generation Partnership Project (3GPP), Mobile Competence Centre; 650, Route Des Lucioles; F-06921 Sophia-Antipolis Cedex; France, vol. RAN WG2, No. V16.7.0, Dec. 23, 2021 (Dec. 23, 2021), pp. 1-158, XP052083421. Item 2 Continued: Retrieved from the Internet: URL:https://ftp.3gpp.org/Specs/archive/38_series/38.321/38321-g?0.zip 38321-g70.docx [retrieved on Dec. 23, 2021].

\* cited by examiner

TECHNIQUES FOR COMMUNICATING OVER CONFIGURED GRANT RESOURCES WITH HIGH ROUND TRIP TIMES

FIELD OF THE DISCLOSURE

Aspects of the present disclosure relate generally to wireless communication systems, and more particularly, to techniques for communicating over configured grant resources.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, configured grants can be used where periodic resources can be configured for device (e.g., user equipment (UE)) communications. In some wireless networks, such as non-terrestrial networks (NTNs), round trip time (RTT) for communications between the network and a device (e.g., a UE) can be larger than in terrestrial networks due to additional latency of NTN connections.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication is provided that includes receiving, from a network node, a first transmission for configuring a configured grant, wherein the configured grant allocates one or more resources associated with an uplink transmission process having a transmission process identifier, obtaining a first indication that the network node uses a fallback downlink control information (DCI) format, and modifying, based at least in part on obtaining the first indication and the transmission process identifier, the uplink transmission process.

In another aspect, a method for wireless communication is provided that includes transmitting a first transmission for configuring a configured grant, wherein the configured grant allocates one or more resources associated with an uplink transmission process having a transmission process identifier, transmitting a first indication of using a fallback DCI format, and receiving based at least in part on transmitting the first indication, and based at least in part on the transmission process identifier, one or more uplink transmissions according to modifying the uplink transmission process.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
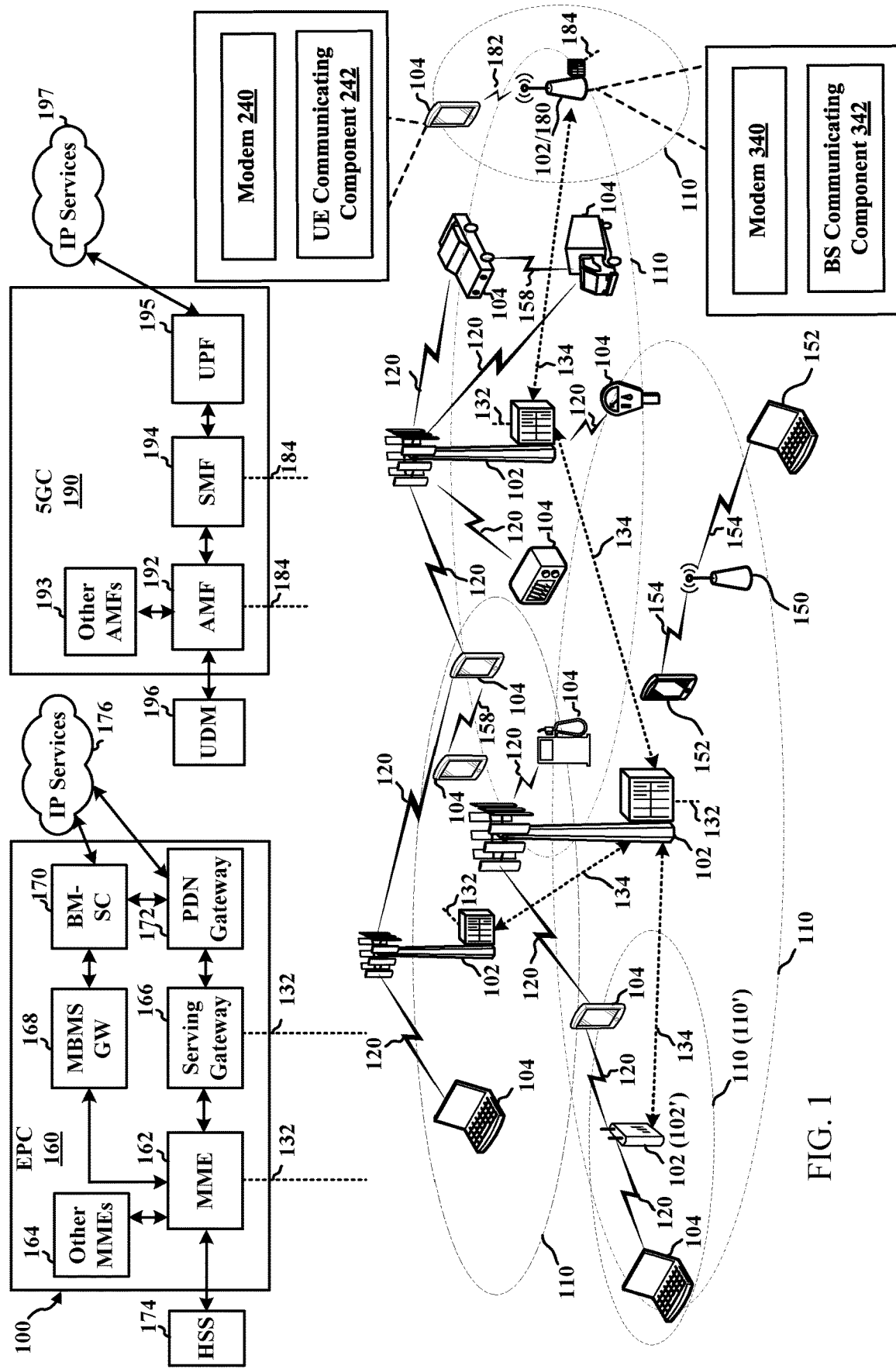
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to modifying an uplink transmission process for using configured grant (CG) resources in networks with relatively high round trip time (RTT) in communications between nodes (e.g., between a user equipment (UE) and a network node, such as a base station). In an example, non-terrestrial networks (NTNs) may involve use of nodes for extending communication range, but the nodes may have higher associated latency (e.g., satellite-based technologies). As such, in some examples, a UE may not be able to receive a dynamic DCI scheduling transmission or retransmission (also referred to in combination herein as (re-)transmission) of an HARQ process associated to the CG, in time. Aspects described herein relate to modifying the uplink transmission process in such scenarios.

For example, in wireless communication technologies such as fifth generation (5G) new radio (NR), fallback downlink control information (DCI) formats can be used by the network (NW) to schedule resources for a UE's uplink transmissions and/or downlink receptions and to avoid uncertainties between the UE and NW. For example, if the NW does not know the exact time when the UE has applied a new radio resource control (RRC) configuration of a transmitted RRC message and a non-fallback DCI would indicate a relevant configuration contained in the RRC message, the NW may use fallback DCI to schedule the UE. In one example, the NW can send an RRC Reconfiguration message containing a new configuration to the UE, while the RRC Reconfiguration message may be successfully received by the UE after one or multiple automatic repeat/request (ARQ)/hybrid ARQ (HARQ) retransmissions. Thus, before NW can ensure the UE applies the new configuration, e.g. via receiving a packet data convergence protocol (PDCP)/radio link control (RLC) status report from the UE, NW may use fallback DCI formats (also referred to as fallback DCIs) to schedule the considered UE. In NTNs, due to a large RTT between the UE and NW (e.g., between the UE and base station or other radio access network (RAN) node), NW may use the fallback DCI for scheduling the UE for a longer time duration comparing to the terrestrial network (TN), before it can ensure the UE applies the new configuration.

In 5G NR, for example, fallback DCI, e.g. DCI format 0_0 and DCI format 1_0 according to third generation partnership project (3GPP) technical specification (TS) 38.212, may only support a certain number of HARQ processes, and thus the fallback DCI may not be able to indicate a HARQ process identifier (ID) larger than, or equal to, the certain number (e.g., 16 HARQ processes). For CG scheduling periodic uplink resources or semi-persistent scheduling (SPS) grants scheduling periodic downlink resources in 5G NR, however, a larger number of HARQ processes can be supported (e.g., 32 HARQ processes). For CG/SPS, according to third generation partnership project (3GPP) technical specification (TS) 38.321, the HARQ-processes ID is calculated from parameters of radio resource allocation in time domain, e.g. configured periodicity, start offset in time domain, configured HARQ process number. Resource allocation for a retransmission (reTX) of a CG/SPS can be scheduled by a DCI using the configured scheduling radio network temporary identifier (CS-RNTI) of the UE, which may correspond to CG/SPS scheduling.

In an example, a configured grant timer (referred to as configuredGrantTimer in 3GPP TS 38.321) can be configured for a configured grant configuration (CG-config), where a HARQ process associated to the CG is not used for a new CG transmission while its associated configuredGrantTimer is running. This allows the network (e.g., gNB) to schedule retransmissions of that HARQ process ID by a DCI indicating a dynamic grant, if needed, during the period defined by the configured grant timer. Thus, if a CG resource associated to that HARQ process ID occurs while the associated configuredGrantTimer is running, the CG resource can neither be used for a new transmission nor a re-transmission. Due to the large RTT between the UE and network (e.g., base station or other RAN node) in NTN, the configuredGrantTimer can be extended, such that NW may take account of the uplink (UL) decoding status to schedule a retransmission. During this time, however, if the NW has to use fallback DCI to schedule the considered UE and HARQ process ID (HP ID), e.g. denoted as n+1, is greater than the maximum number supported for fallback DCI (e.g., greater than 15), HP ID n+1>15, the UE may not be able to receive a reTX scheduling for that HARQ process, and thus the UE may waste its CG resource to wait for a reTX scheduling that is not possible.

Aspects described herein relate to modifying the uplink transmission process at least this or similar scenarios to optimize resource utilization. For example, based on a transmission process identifier of the uplink transmission process, the uplink transmission process can be modified to optimize resource utilization. In examples described above, where the HARQ process identifier is greater (or exceeds) than a threshold (e.g., 15), the HARQ process can be modified. For example, for such uplink transmission processes, modification can include disabling the configured grant timer while the UE is not able to receive a reTX scheduling for the uplink transmission process, transmitting a new transmission over CG resources while the UE is not able to receive a reTX scheduling for the uplink transmission process, transmitting a retransmission over CG resources when the configured grant timer is running and while the UE is not able to receive a reTX scheduling for the uplink transmission process, or other modifications, as described herein.

In an example, modifying the uplink transmission process to use the CG resources in this regard can improve throughput of the UE. For example, the UE can continuously use the CG resources associated to the uplink transmission processes with certain transmission process identifiers (e.g., HARQ process identifier >15), during the time when NW applies fallback DCIs or associated format to schedule the UE. Thus, the CG resources are not wasted for the UE, and this can lead to a better spectral efficiency. As the CG resources associated to uplink transmission processes with certain transmission process identifiers (e.g., HARQ process identifier >15) can be continuously used by the UE during the time when NW applies fallback DCIs or associated format, the UE's service(s) may continue without interruption, and the quality of experience can be improved. For example, the UE's latency can be reduced, if the CG resource is used for a new transmission, and the UE's communication reliability can be improved, if the CG resource is used for a retransmission.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for modifying uplink transmission processes for CG resources to account for high RTT, in accordance with aspects described herein. In addition, some nodes may have a modem 340 and BS communicating component 342 for configuring devices for modifying uplink transmission processes for CG resources to account for high RTT, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, UE communicating component 242 can modify an uplink transmission process using CG resources where high RTT is possible. For example, UE communicating component 242 can modify the uplink transmission process based on the possibility that CG resources may not be otherwise utilized. In a specific example, UE communicating component 242 can determine that CG resources of the uplink transmission process cannot be used for new transmission or retransmission based on limitations defined in the wireless communication technology, and can accordingly utilize the CG resources for communications by modifying the uplink transmission process, as described further herein. For example, UE communicating component 242 can modify the uplink transmission process based on a transmission process identifier (e.g., where the transmission process identifier is larger than a threshold, such as 15), based on the base station 102 using a fallback DCI format to schedule the UE, to activate CG resources, and/or based on whether a configured grant timer is running, etc. In another example, BS communicating component 342 can configure the UE 104 to modify the uplink transmission process, which can include configuring CG resources, transmitting an indication of using fallback DCI format, disabling/enabling a configured grant timer, etc.

Figure 2:
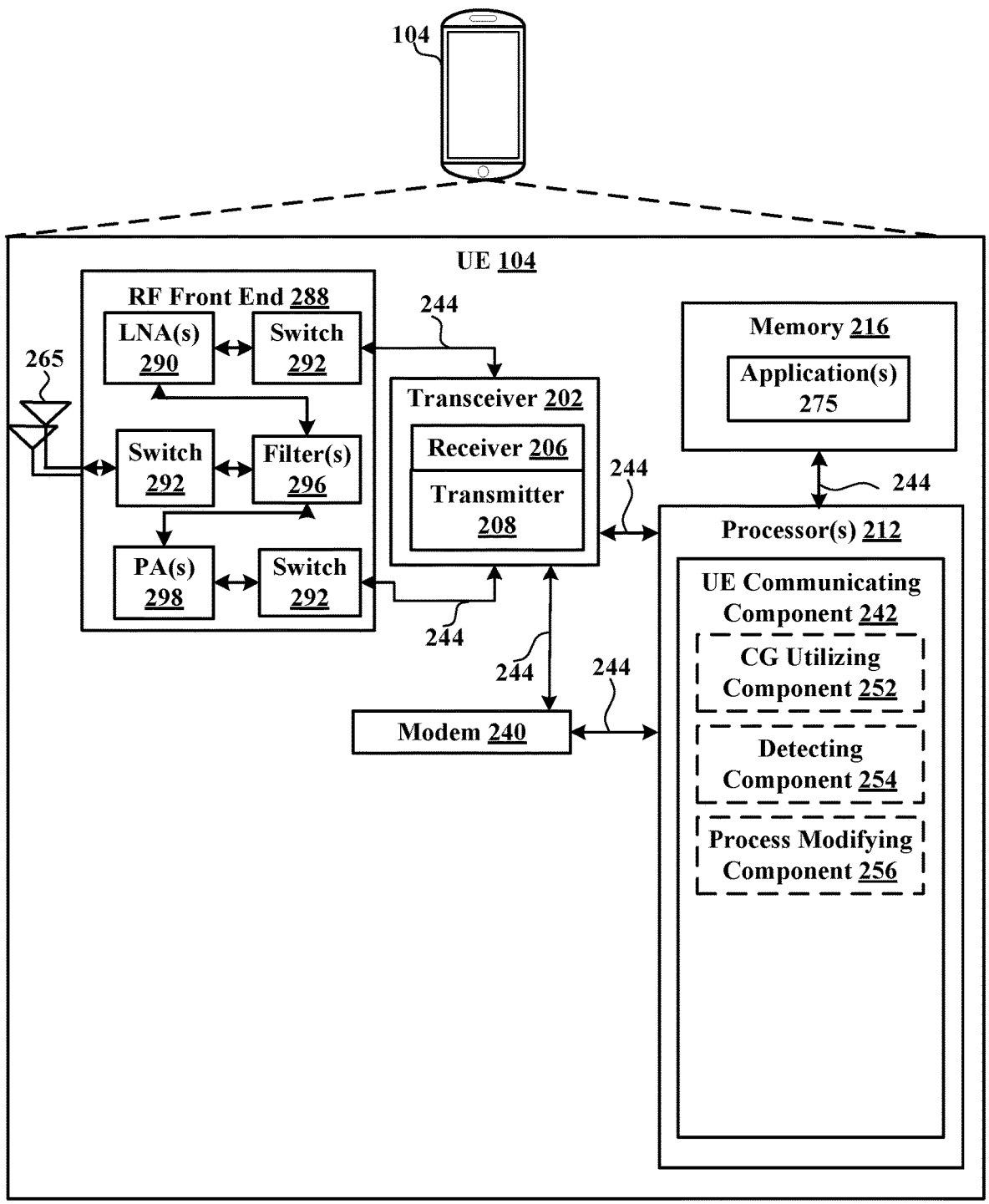
FIG. 2 is a block diagram illustrating an example of a user equipment (UE), in accordance with various aspects of the present disclosure.
Figure 3:
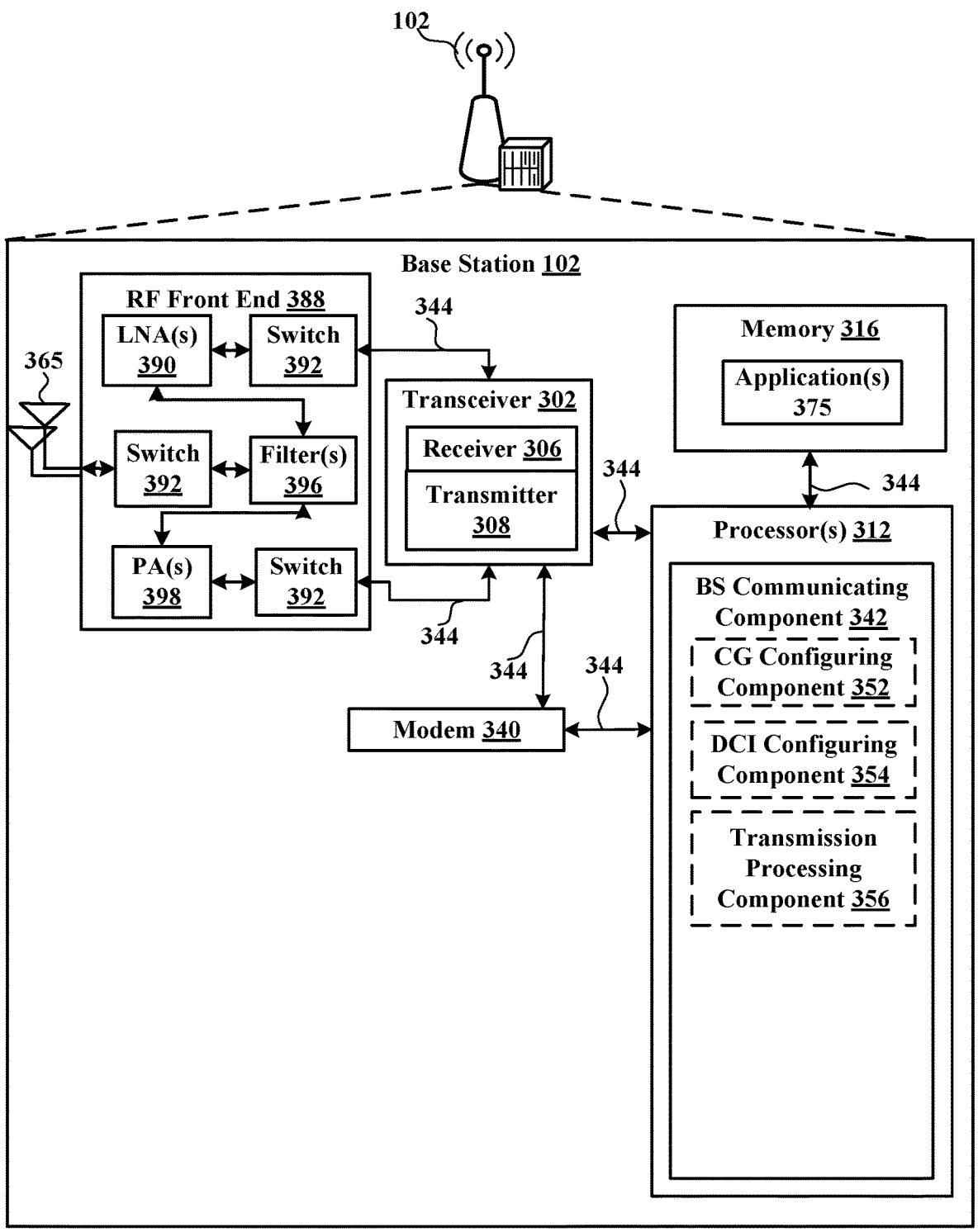
FIG. 3 is a block diagram illustrating an example of a base station, in accordance with various aspects of the present disclosure.
Figure 4:
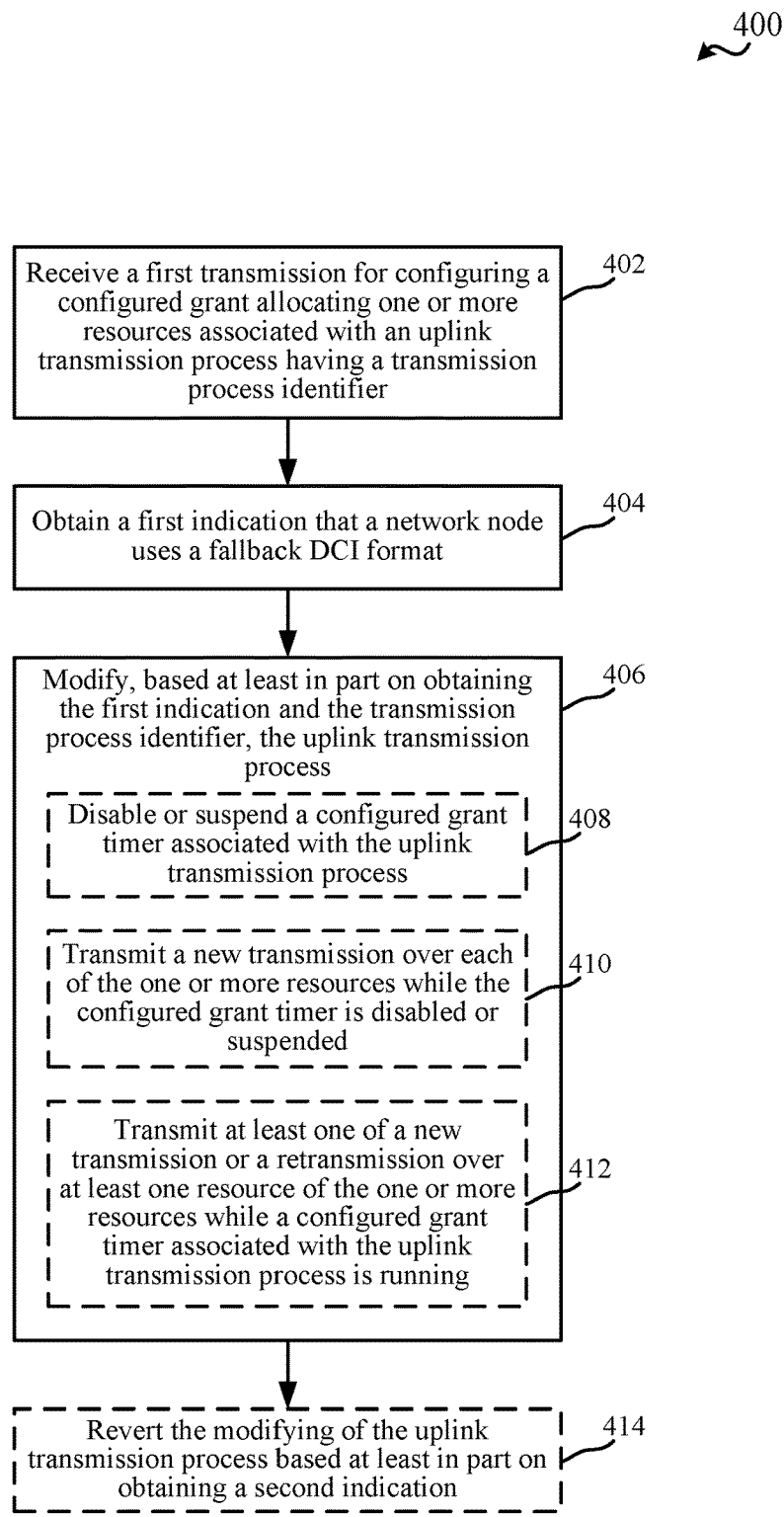
FIG. 4 is a flow chart illustrating an example of a method for modifying an uplink transmission process for configured grant (CG) resources, in accordance with aspects described herein.
Figure 6:
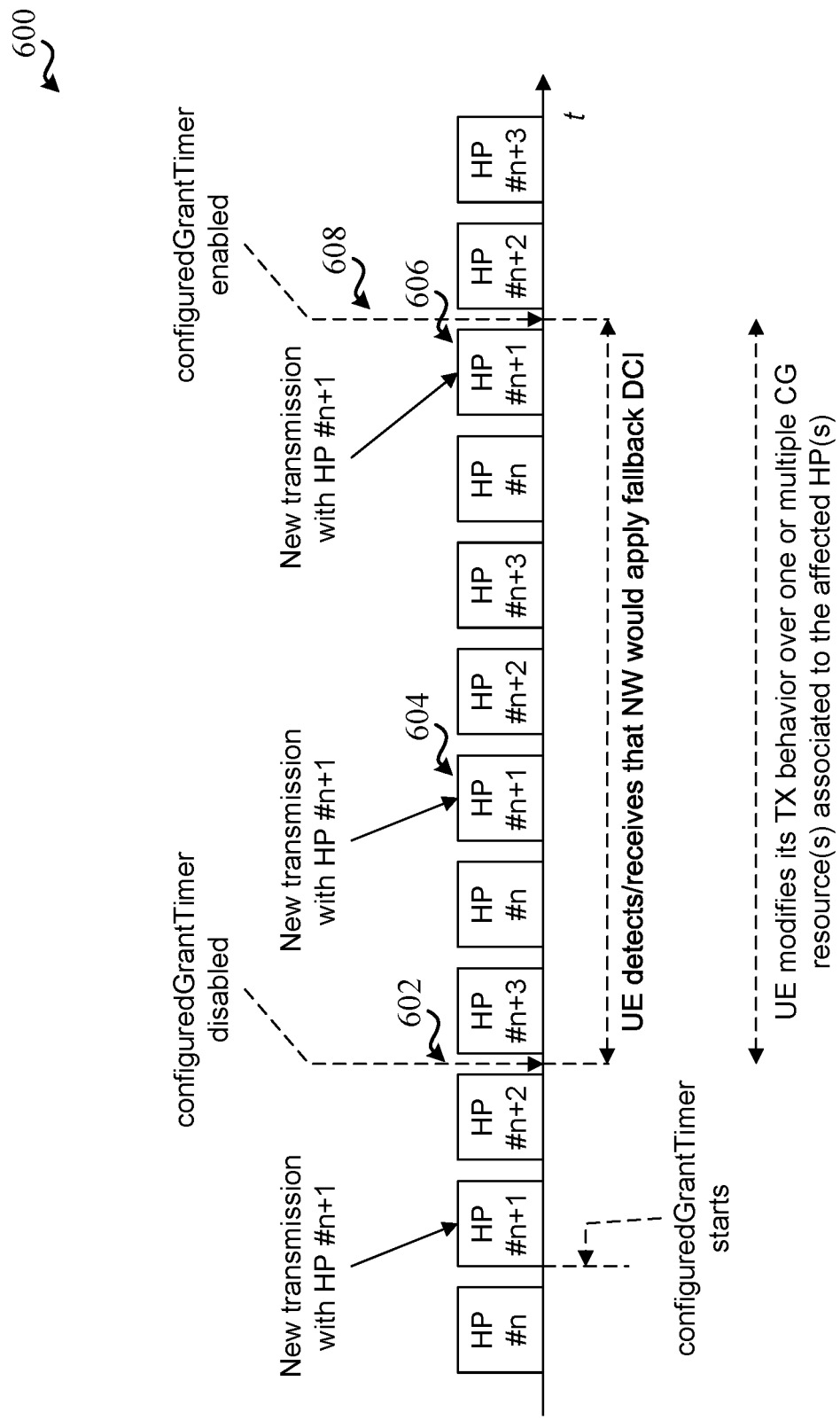
FIG. 6 illustrates an example of a timeline of CG allocated resources for multiple uplink transmission processes, and disabling a configured grant timer, in accordance with aspects described herein.
Figure 7:
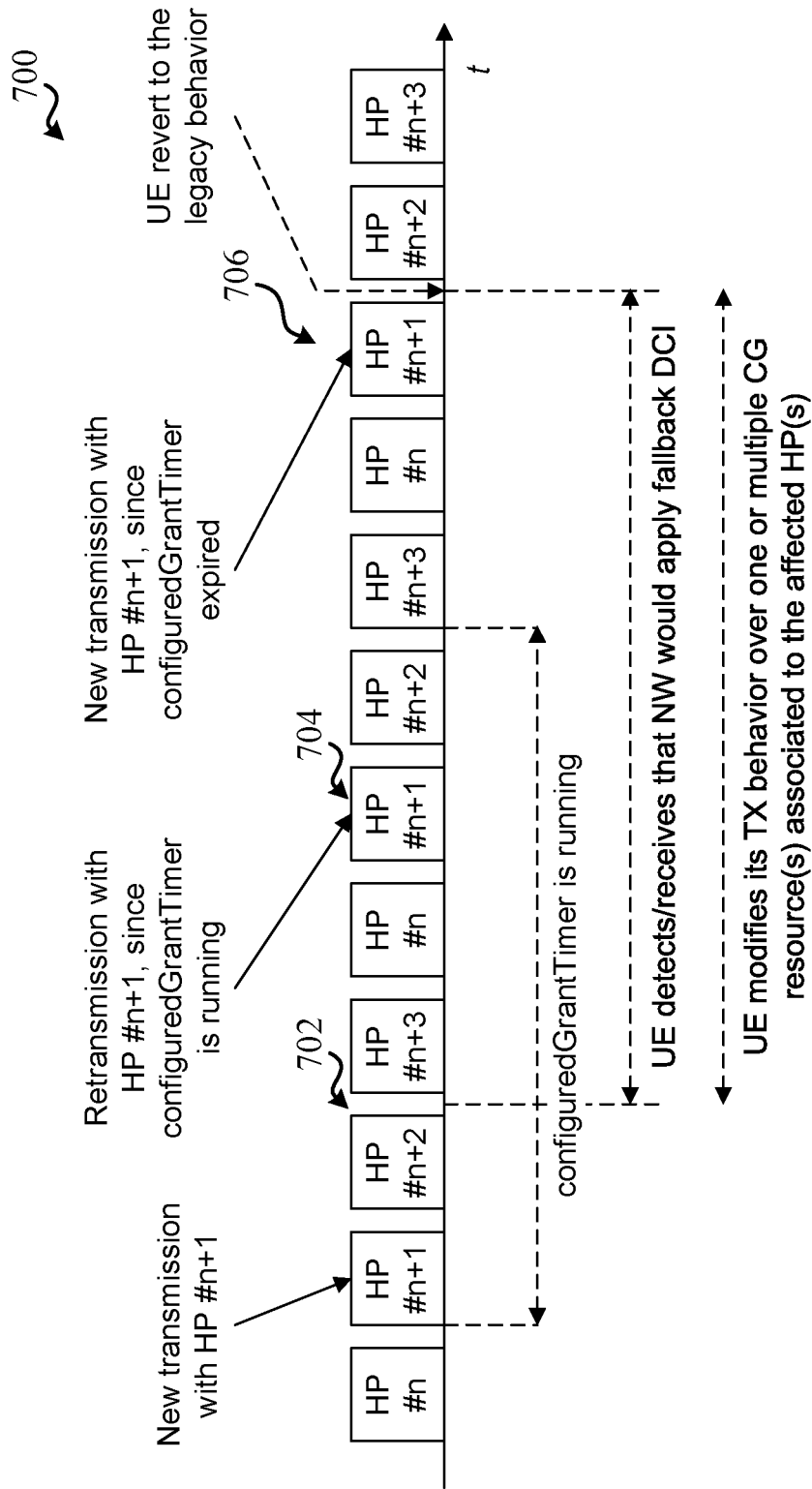
FIG. 7 illustrates an example of a timeline of CG allocated resources for multiple uplink transmission processes, and transmitting a retransmission when a configured grant timer is running, in accordance with aspects described herein.
Figure 8:
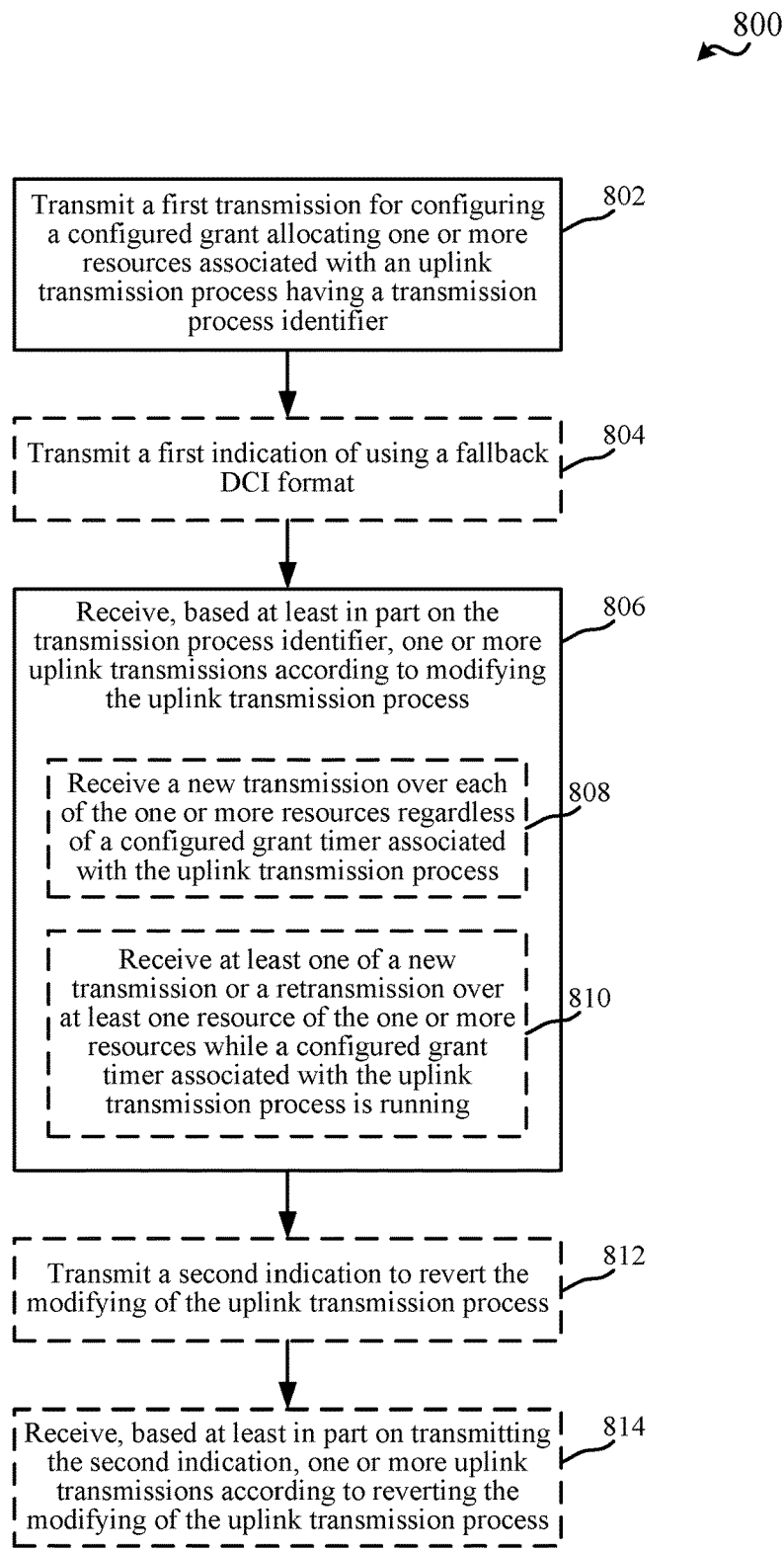
FIG. 8 is a flow chart illustrating an example of a method for configuring a device for modifying an uplink transmission process for CG resources, in accordance with aspects described herein.

Turning now to FIGS. 2-10, aspects are depicted with reference to one or more components and one or more methods that may perform the actions or operations described herein, where aspects in dashed line may be optional. Although the operations described below in FIGS. 4 and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for modifying uplink transmission processes for CG resources to account for high RTT, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a CG utilizing component 252 for utilizing CG resources for transmitting uplink communications, a detecting component 254 for processing DCI received from a base station or other network node, and/or a process modifying component 256 for modifying an uplink transmission process to utilize CG resources, which may be based on one or more of detecting a fallback DCI, a configured grant timer, a network type or configuration (e.g., as being a NTN), etc., in accordance with aspects described herein.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for configuring devices for modifying uplink transmission processes for CG resources to account for high RTT, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a CG configuring component 352 for configuring and/or activating CG resources for a UE 104, a DCI configuring component 354 for transmitting DCI to the UE 104, and/or a transmission processing component 356 for processing uplink communications received from the UE 104, in accordance with aspects described herein.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for modifying an uplink transmission process for CG resources, in accordance with aspects described herein. In an example, a UE 104 can perform the functions described in method 400 using one or more of the components described in FIGS. 1 and 2.

In method 400, at Block 402, a first transmission can be received for configuring a configured grant allocating one or more resources associated with an uplink transmission process having a transmission process identifier. In an aspect, CG utilizing component 252, e.g., in conjunction with processor(s) 212, memory 216, transceiver 202, UE communicating component 242, etc., can receive the first transmission for configuring the configured grant allocating one or more resources associated with an uplink transmission process having a transmission process identifier. For example, the first transmission can include a configuration of CG resources that may or may not be activated by dynamic signaling, such as DCI. In an example, CG utilizing component 252 can receive the first transmission over RRC signaling from the base station 102, where the signaling can configure the CG based on indicating one or more related parameters, such as a starting time, duration, periodicity, etc.

In an example, the CG resources can be defined in a frequency range over a period of time. For example, the CG resources can be defined in a system bandwidth, as a portion of system bandwidth, such as a bandwidth part (BWP), a frequency channel, a collection of subcarriers or resource elements (REs), such as a collection of resource blocks (RBs), etc. In addition, for example, the CG resources can be defined in one or more symbols (e.g., orthogonal frequency division multiplexing (OFDM) symbols, single carrier-frequency division multiplexing (SC-FDM) symbols, etc.), one or more slots of one or more symbols, and/or the like. For example, CG utilizing component 252 can receive the first transmission configuring the CG allocating the resources as an indication of a starting symbol, a periodicity of symbols indicating each subsequent symbol, a number of symbols allocated according to the periodicity, etc. In addition, for example, CG utilizing component 252 can receive the first transmission configuring the CG allocating the resources for each of one or multiple uplink transmission processes, which may have an associated transmission process identifier (e.g., HARQ process IDs for multiple HARQ processes). An example of a CG allocation of resources is shown in FIG. 5.

Figure 5:
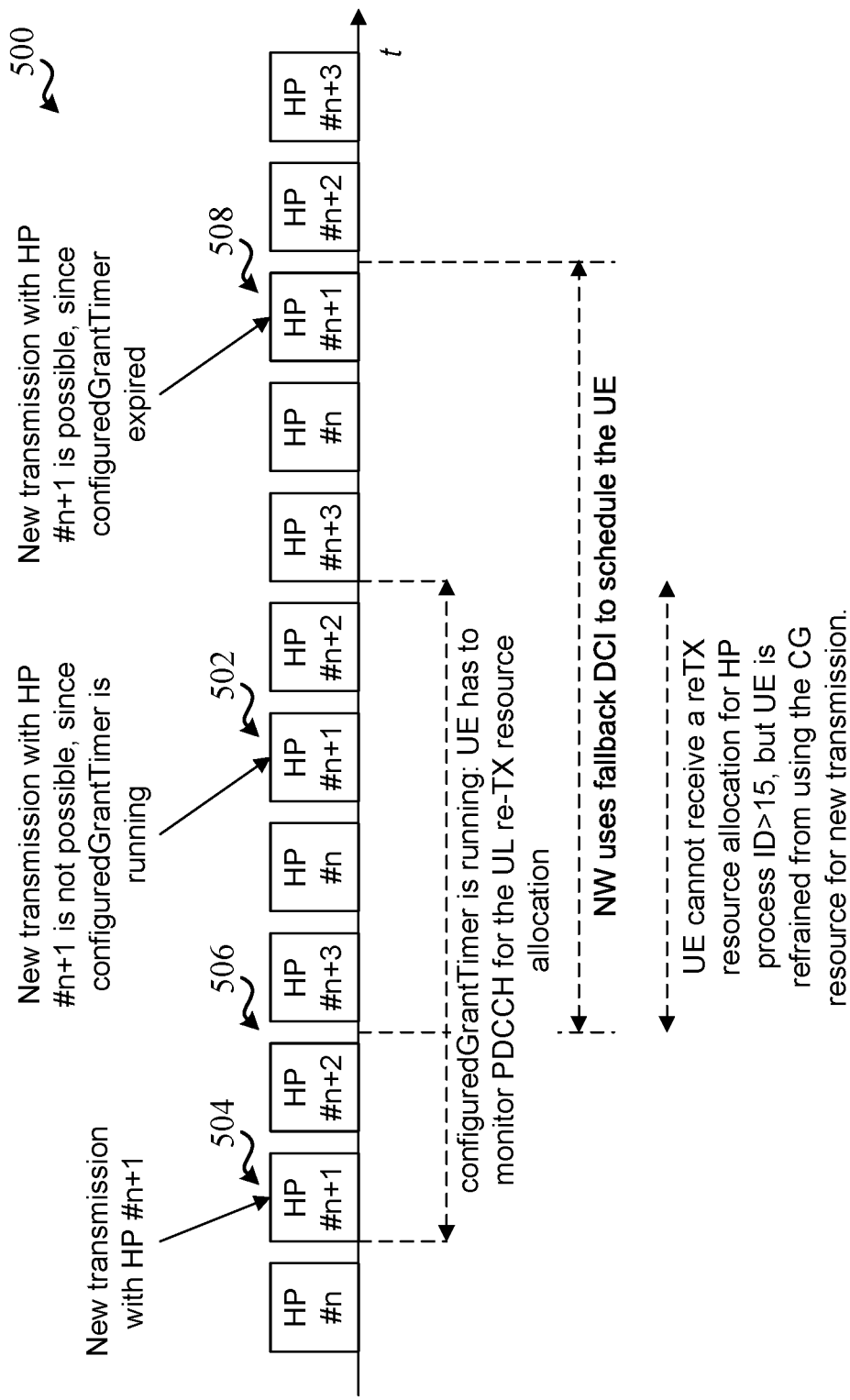
FIG. 5 illustrates an example of a timeline of CG allocated resources for multiple uplink transmission processes, in accordance with aspects described herein.

FIG. 5 illustrates a timeline 500 of CG allocated resources associated to multiple HARQ processes, identified by HARQ process identifiers n, n+1, n+2, n+3. The CG allocation, which can be received by the CG utilizing component 252, can indicate a starting symbol and periodicity for each of the CG resources and/or HARQ process identifiers n, n+1, n+2, n+3, resulting in timeline 500 for transmitting uplink transmissions as part of the corresponding HARQ processes. As described, in an example, CG utilizing component 252 can receive the CG allocating the resources, which can then be activated in separate signaling (e.g., DCI) for use in transmitting uplink transmissions. In some cases, the received CG, e.g. from RRC signaling, may not need to be activated in separate signaling. In other words, the UE may activate the received CG, once upon received the CG configuration.

In method 400, at Block 404, a first indication that a network node uses a fallback DCI format can be obtained. In an aspect, detecting component 254, e.g., in conjunction with processor(s) 212, memory 216, transceiver 202, UE communicating component 242, etc., can obtain, and/or process, the first indication that the network node (e.g., a network node for which the CG resources are configured, such as a base station 102) uses a fallback DCI format. In an example, detecting component 254 can receive the indication from the network node (e.g., from the base station 102) as DCI over a physical downlink control channel (PDCCH) or other channel. For example, as described, the network node can transmit the fallback DCI to the UE 104 where the network node has not received a confirmation that the UE 104 received and/or processed a previous RRC Reconfiguration message containing new/updated configuration for uplink transmission.

In one example, detecting component 254 can detect or receive a first indication that the NW switches to use fallback DCI format. The first indication may include an implicit indication that may be obtained or otherwise determined based on one or more of receiving a configured number (e.g., one or multiple) of fallback DCIs. In one example, detecting component 254 can receive the first indication as receiving consecutive fallback DCIs without receiving a non-fallback DCI. In another example, detecting component 254 can receive the first indication (thus determining to process a fallback DCI) based at least in part on receiving an RRC message containing a new configuration, and/or the like. In another example, detecting component 254 can receive the first indication (thus determining to process a fallback DCI) based at least in part on an explicit indication from NW via DCI, media access control (MAC) control element (CE), and/or RRC message, as described. For example, the first indication may be carried either in the DCI scheduling the RRC message with a new configuration, or in a MAC CE scheduled by a fallback DCI.

In an example, the first indication may further indicate one or more other parameters, such as the network node's estimated time duration to apply fallback DCIs, the expected UE behavior for configuredGrantTimer and/or for using the CG resources associated to an affected uplink transmission process (e.g., HARQ process(s) with HP ID >15), etc. In one example, the one or more parameters related to expected UE behavior may include one or more of an indication that the UE may send a new transmission for each CG resource associated to the affected uplink transmission process (e.g., HARQ process), an indication that the UE may apply retransmission in a CG resource associated to the affected uplink transmission process (e.g., HARQ process) that may have an associated configuredGrantTimer running, etc. In another example, the first indication may include an indication that the UE may send a new transmission and one or more blind retransmission(s) over a number of CG resources associated to the affected uplink transmission process (e.g., HARQ process), before the UE can start another new transmission. In one option, the configuredGrantTimer may be disabled at the UE, and the UE may simply follow the indicated behavior, as described further herein.

An example of such a CG resource is illustrated in FIG. 5 at 502, which indicates an autonomous transmission using the CG resource associated to HARQ process n+1, e.g. an autonomous new transmission or an autonomous retransmission, is not possible as the configured grant timer associated to HARQ process n+1 is running. In timeline 500, the configured grant timer can be running at the time the new transmission for HARQ process n+1 is transmitted at 504 until after the next transmission opportunity for HARQ process n+1 502. In addition, the network can switch to using fallback DCI format to schedule the UE at 506, at least until after the transmission opportunity at 508. Accordingly, new transmission may not be possible at least at the next transmission opportunity for HARQ process n+1 502. In addition, as the UE is to monitor PDCCH for the uplink retransmission resource allocation while the configured grant timer is running, where the HARQ process identifier n+1>15, the UE also cannot receive the retransmission resource allocation for HARQ process n+1 502 due to limitations of the fallback DCI, e.g. the fallback DCI cannot schedule the HARQ process identifier n+1>15. Also, the UE is refrained from using the CG resource for new transmission and/or retransmission while the configured grant timer is running. Thus, this CG resource may be wasted in this case. Examples are described herein that relate to modifying the uplink transmission process to utilize this resource in this case or similar scenarios.

In any case, for example and/or in one or more of the above examples, detecting component 254 can obtain the first indication (whether implicit or explicit) that the network node uses fallback DCI format. In addition, in an example, detecting component 254 may obtain the one or more other parameters to determine the network node's estimated time duration for applying fallback DCI and/or expected UE behavior for determining how to modify the uplink transmission process, as described further herein.

In method 400, at Block 406, the uplink transmission process can be modified based at least in part on obtaining the first indication and the transmission process identifier. In an aspect, process modifying component 256, e.g., in conjunction with processor(s) 212, memory 216, transceiver 202, UE communicating component 242, etc., can modify, based at least in part on obtaining the first indication and the transmission process identifier, the uplink transmission process. For example, process modifying component 256 may modify uplink transmission processes where the transmission process identifier, e.g. HARQ process identifier, is of a certain value or achieves a threshold (e.g., greater than 15, as described). For example, the certain value or threshold may relate to an uplink transmission process for which explicit fallback DCI scheduling the uplink transmission process cannot be received. This may indicate that CG resources for the uplink transmission process may possibly be wasted in certain scenarios, such as where a configured grant timer is running, where CG resources are allocated, where the network is a NTN, etc.

In an example, based on detecting component 254 obtaining, detecting, or otherwise receiving the first indication, as described above, process modifying component 256 can modify the uplink transmission process (e.g., modify the UE behavior regarding the configuredGrantTimer) at least for the affected uplink transmission process (e.g., HARQ process). For example, the affected uplink transmission process may include HARQ processes associated to a CG with a HARQ process ID >15, as described. In addition, for example, modifying the uplink transmission process can include, for example, determining whether to perform a new transmission or a retransmission over a CG resource associated to the affected uplink transmission process (e.g., HARQ process), such as the resource for HARQ process n+1 502. Thus, in an example, in modifying the uplink transmission process, process modifying component 256 may autonomously use the CG resource(s) associated to the affected uplink process(es) for uplink transmission, such as the resource for HARQ process n+1 502, without waiting for a retransmission scheduling DCI.

In a specific example, in modifying the uplink transmission process corresponding to the transmission process identifier, process modifying component 256 may disable, stop, or otherwise suspend the configuredGrantTimer at least for the affected uplink transmission process (e.g., HARQ process). In this example, based on the modified uplink transmission process, UE communicating component 242 may autonomously perform a new transmission over each of the CG resources associated to the affected uplink transmission process (e.g., HARQ process), such as the resource for HARQ process n+1 502.

For example, in modifying the uplink transmission process at Block 406, optionally at Block 408, a configured grant timer associated with the uplink transmission process can be disabled or suspended. In an aspect, process modifying component 256, e.g., in conjunction with processor(s) 212, memory 216, transceiver 202, UE communicating component 242, etc., can disable or suspend the configured grant timer associated with the uplink transmission process. For example, process modifying component 256 can disable or suspend the configured grant timer based on obtaining the DCI fallback indication at Block 404 and/or based on detecting that the transmission process identifier is of a certain value (e.g., >15). For example, in modifying the uplink transmission process at Block 406, optionally at Block 410, a new transmission can be transmitted over each of the one or more resources while the configured grant timer is disabled or suspended. In an aspect, as a result of disabling or suspending the configured grant timer, UE communicating component 242, e.g., in conjunction with processor(s) 212, memory 216, transceiver 202, etc., can transmit the new transmission over each of the one or more resources while the configured grant timer is disable or suspended. Thus, the resources, such as the resource for HARQ process n+1 502, are not wasted where the UE is not going to possibly receive a DCI scheduling retransmission, as explained above. An example is shown in FIG. 6.

FIG. 6 illustrates a timeline 600 of CG allocated resources for multiple HARQ processes, identified by HARQ process identifiers n, n+1, n+2, n+3, and disabling a configured grant timer. The CG allocation, which can be received by the CG utilizing component 252, can indicate a starting symbol and periodicity for each of the HARQ process identifiers n, n+1, n+2, n+3, resulting in timeline 600 for transmitting uplink transmissions as part of the corresponding HARQ processes, as described. In an example, detecting component 254 can detect that the network is using or may use fallback DCI, or associated format, at 602. Accordingly, for example, process modifying component 256 can disable, stop, suspend, etc., the configured grant timer for the corresponding uplink transmission process. In an example, this may also be based on determining that the transmission process identifier is of a certain value (e.g., >15). With the configured grant timer disabled, UE communicating component 242 can transmit a new transmission at the next transmission opportunity for HARQ process n+1 604 and/or at another next transmission opportunity for HARQ process n+1 606. In an example, process modifying component 256 can continue modifying the uplink transmission process in this regard to transmit the new transmissions until detecting component 254 detects that fallback DCI or associated format is no longer used by the network node, at which time the configured grant timer may be enabled at 608, as described further herein. Thus, during this time, the UE can modify its transmission behavior over one or multiple CG resources associated to the affected HARQ processes.

In a specific example, in modifying the uplink transmission process corresponding to the transmission process identifier, process modifying component 256 may apply a retransmission in a CG resource associated to an affected uplink transmission process (e.g., HARQ process), when the associated configuredGrantTimer is running. After the associated configuredGrantTimer expires, for example, the UE communicating component 242 can perform a new transmission in the next CG resource associated to the affected uplink transmission process (e.g., HARQ process).

For example, in modifying the uplink transmission process at Block 406, optionally at Block 412, at least one of a new transmission or a retransmission can be transmitted over at least one resource of the one or more resources while a configured grant timer associated with the uplink transmission process is running. In an aspect, process modifying component 256, e.g., in conjunction with processor(s) 212, memory 216, transceiver 202, UE communicating component 242, etc., can modify the uplink transmission process such that at least one of a new transmission or a retransmission can be transmitted over at least one resource of the one or more resources while a configured grant timer associated with the uplink transmission process is running. For example, UE communicating component 242 can transmit at least one of the new transmission or retransmission(s) according to various examples described herein. One example is shown in FIG. 7.

FIG. 7 illustrates a timeline 700 of CG allocated resources for multiple HARQ processes, identified by HARQ process identifiers n, n+1, n+2, n+3, and transmitting a retransmission when a configured grant timer is running. The CG allocation, which can be received by the CG utilizing component 252, can indicate a starting symbol and periodicity for each of the HARQ process identifiers n, n+1, n+2, n+3, resulting in timeline 700 for transmitting uplink transmissions as part of the corresponding HARQ processes, as described. In an example, detecting component 254 can detect that the network is using or may use fallback DCI, or associated format, at 702. In this example, while the configured grant timer is running and while the network is using fallback DCI, UE communicating component 242 can transmit a retransmission at the next transmission opportunity for HARQ process n+1 704. In an example, when the configured grant timer is not running, and though the network may still be using fallback DCI, UE communicating component 242 can transmit a new transmission at the next transmission opportunity for HARQ process n+1 706. Once the network stops using fallback DCI, the UE can revert to the previous behavior (e.g., legacy behavior) of not transmitting new transmissions and waiting for fallback DCI to schedule retransmissions while the configured grant timer is running.

Thus, the UE can modify its transmission behavior over one or multiple CG resources associated to the affected HARQ process, as described.

In another specific example, the UE may follow an explicit indication received from the NW regarding how to use the CG resources associated to the affected uplink transmission process (e.g., HARQ process). As described, for example, detecting component 254 can receive one or more parameters with the first indication that specify UE behavior for modifying the uplink transmission process. In this example, process modifying component 256 can modify the uplink transmission process based on, or using, the one or more parameters. For example, process modifying component 256 can modify the uplink transmission process to cause the new transmission regardless of configured grant timer, to cause retransmission while the configured grant timer is running, etc., so as not to waste the CG resources, as described.

In another specific example, the UE may determine its behavior based on other considerations, such as a quality of service (QoS) requirement of the data to be transmitted as part of the uplink transmission process and/or the associated logical channel (LCH) over which the data is to be transmitted over the CG resources. For example, in case of a high reliability requirement for the LCH(s), process modifying component 256 may modify the uplink transmission process to perform one or multiple blind retransmissions over the CG resources before it can use the affected uplink transmission process (e.g., HARQ process) for another new transmission. This may also be based on whether the configured grant timer is running, based on the transmission process identifier value, etc.

In another specific example, if the detecting component 254 detects or receives a fallback DCI for a dynamic grant (DG) within the time window configuredGrantTimer of an affected uplink transmission process (e.g., HARQ process), and the resource allocation (e.g. time and/or frequency allocation) in the DG is the same as a CG resource associated to the affected uplink transmission process (e.g., HARQ process) in the time-and/or-frequency domain, detecting component 254 can interpret the actual scheduled HARQ process ID as equal to the HARQ process ID in DCI plus the threshold (e.g., +16), and can accordingly follow the transmission process for the HARQ process ID plus the threshold, which can include transmitting a retransmission or not based on whether the DCI indicates fallback DCI or associated format. In this example, the network node can avoid scheduling a same resource as this CG resource in the time-and/or-frequency domain for any HARQ process with HARQ process ID less than the threshold (<16).

In method 400, optionally at Block 414, the modifying of the uplink transmission process can be reverted based at least in part on obtaining a second indication. In an aspect, process modifying component 256, e.g., in conjunction with processor(s) 212, memory 216, transceiver 202, UE communicating component 242, etc., can revert the modifying of the uplink transmission process based at least in part on obtaining the second indication. For example, process modifying component 256 can revert the modifying of the uplink transmission process at least in part by enabling or resuming the configured grant timer, or usage thereof, for the affected uplink transmission process. In another example, process modifying component 256 can revert the modifying of the uplink transmission process at least in part by continuing to wait until fallback DCI is received before transmitting and/or retransmitting uplink transmissions for the affected uplink transmission process. For example, process modifying component 256 can receive or determine the second indication based at least in part on at least one of receiving at least a configured number (e.g., one or multiple) of non-fallback DCIs from the network node, which can include receiving a number of consecutive non-fallback DCIs without receiving a fallback DCI, obtaining, from the first indication, a time duration for applying the fallback DCI (and/or detecting expiration of this time duration), receiving the second indication in signaling from the network node, etc.

Examples are shown in FIGS. 6 and 7. In timeline 600 in FIG. 6, for example, modification of the uplink transmission process is reverted by enabling the configuration grant timer is enabled at 608. In timeline 700 in FIG. 7, for example, modification of the uplink transmission process is reverted at 708 by the UE falling back to the previous behavior (e.g., the legacy behavior) of waiting for fallback DCI to schedule retransmissions when the configured grant timer is running.

FIG. 8 illustrates a flow chart of an example of a method 800 for configuring a device for modifying an uplink transmission process for CG resources, in accordance with aspects described herein. In an example, a base station 102 can perform the functions described in method 800 using one or more of the components described in FIGS. 1 and 3.

In method 800, at Block 802, a first transmission can be transmitted for configuring a configured grant allocating one or more resources associated with an uplink transmission process having a transmission process identifier. In an aspect, CG configuring component 352, e.g., in conjunction with processor(s) 312, memory 316, transceiver 302, BS communicating component 342, etc., can transmit the first transmission for configuring the configured grant allocating the one or more resources associated with the uplink transmission process having the transmission process identifier. For example, the first transmission can include a configuration of CG resources that may or may not be activated by dynamic signaling, such as DCI, as described. In an example, CG configuring component 352 can transmit the first transmission to a UE 104 over RRC signaling from the base station 102, where the signaling can configure the CG based on indicating one or more related parameters, such as a starting time, duration, periodicity, etc.

In method 800, optionally at Block 804, a first indication that a network node uses a fallback DCI format can be transmitted. In an aspect, DCI configuring component 354, e.g., in conjunction with processor(s) 312, memory 316, transceiver 302, BS communicating component 342, etc., can transmit the first indication of using a fallback DCI format. In an example, DCI configuring component 354 can transmit the indication as DCI over a PDCCH or other channel. For example, as described, DCI configuring component 354 can transmit the fallback DCI to the UE 104 where the base station 102 has not received a confirmation that the UE 104 received and/or processed a previous RRC Reconfiguration message with a new/updated communication configuration for uplink transmission.

As described, in some examples, the first indication may include an implicit indication that may be obtained or otherwise determined based on one or more of transmitting a configured number (e.g., one or multiple) of fallback DCIs, which may include transmitting consecutive fallback DCIs without transmitting a non-fallback DCI, transmitting an RRC message containing a new configuration, and/or the like. In another example, the first indication may be an explicit indication from NW via DCI, MAC CE, and/or RRC message, as described. For example, the first indication may be carried either in the DCI scheduling the RRC message with a new configuration, or in a MAC CE scheduled by a fallback DCI.

In an example, the first indication may further indicate one or more other parameters, such as the base station's 102 estimated time duration to apply fallback DCIs, the expected UE behavior for configuredGrantTimer and/or for using the CG resources associated to an affected uplink transmission process (e.g., HARQ process(s) with HP ID >15), etc., as described above. In any case, for example a UE 104 can obtain the first indication (whether implicit or explicit) that the network node uses fallback DCI or associated format. In addition, in an example, the UE 104 may obtain the one or more other parameters to determine the network node's estimated time duration for applying fallback DCI and/or expected UE behavior for determining how to modify the uplink transmission process, as described further herein.

In method 800, at Block 806, one or more uplink transmissions can be received, based at least in part on the transmission process identifier, according to modifying the uplink transmission process. In an aspect, transmission processing component 356, e.g., in conjunction with processor(s) 312, memory 316, transceiver 302, BS communicating component 342, etc., can receive, based at least in part on the transmission process identifier, the one or more uplink transmissions according to modifying the uplink transmission process. For example, transmission processing component 356 may receive the one or more uplink transmission according to the modified uplink transmission processes where the transmission process identifier is of a certain value or achieves a threshold (e.g., greater than 15, as described). For example, the certain value or threshold may relate to an uplink transmission process for which explicit fallback DCI cannot be received. This may indicate that CG resources for the uplink transmission process may possibly be wasted in certain scenarios, such as where a configured grant timer is running, where CG resources are allocated, where the network is a NTN, etc., as described.

For example, in receiving the one or more uplink transmissions according to modifying the uplink transmission process at Block 806, optionally at Block 808, a new transmission can be received over each of the one or more resources regardless of a configured grant timer associated with the uplink transmission process. In an aspect, BS communicating component 342, e.g., in conjunction with processor(s) 312, memory 316, transceiver 302, etc., can receive the new transmission over each of the one or more resources regardless of the configured grant timer associated with the uplink transmission process. Thus, the resources are not wasted where the UE is not going to possibly receive a DCI scheduling retransmission, as explained above.

In another example, in receiving the one or more uplink transmissions according to modifying the uplink transmission process at Block 806, optionally at Block 810, at least one of a new transmission or a retransmission can be received over at least one resource of the one or more resources while a configured grant timer associated with the uplink transmission process is running. In an aspect, BS communicating component 342, e.g., in conjunction with processor(s) 312, memory 316, transceiver 302, etc., can receive at least one of the new transmission or the retransmission over at least one resource of the one or more resources while the configured grant timer associated with the uplink transmission process is running. For example, UE 104 can transmit at least one of the new transmission or retransmission(s) according to various examples described herein, while the uplink transmission process is being modified.

In method 800, optionally at Block 812, a second indication to revert the modifying of the uplink transmission process can be transmitted. In an aspect, transmission processing component 356, e.g., in conjunction with processor(s) 312, memory 316, transceiver 302, BS communicating component 342, etc., can revert the modifying of the uplink transmission process based at least in part on obtaining and/or transmitting the second indication. For example, transmission processing component 356 can transmit the second indication to the UE 104, which can modify the uplink transmission process at least in part by enabling or resuming the configured grant timer, or usage thereof, for the affected uplink transmission process, continuing to wait until fallback DCI is received before transmitting and/or retransmitting uplink transmissions for the affected uplink transmission process, etc. For example, transmission processing component 356 can transmit the second indication based at least in part on at least one of transmitting at least a configured number (e.g., one or multiple) of non-fallback DCIs from the network node, which can include transmitting a number of consecutive non-fallback DCIs without transmitting a fallback DCI, transmitting, in the first indication, a time duration for applying the fallback DCI (and/or detecting expiration of this time duration), transmitting the second indication in signaling to the UE, etc.

In method 800, optionally at Block 814, one or more uplink transmissions can be received, based at least in part on transmitting the second indication, according to reverting the modifying of the uplink transmission process. In an aspect, BS communicating component 342, e.g., in conjunction with processor(s) 312, memory 316, transceiver 302, etc., can receive, based at least in part on transmitting the second indication, one or more uplink transmissions according to reverting the modifying of the uplink transmission process. For example, BS communicating component 342 can receive the one or more uplink transmissions where fallback DCI is used to schedule retransmissions and/or where new transmissions can be received when the configured grant timer is not running.

Figure 9:
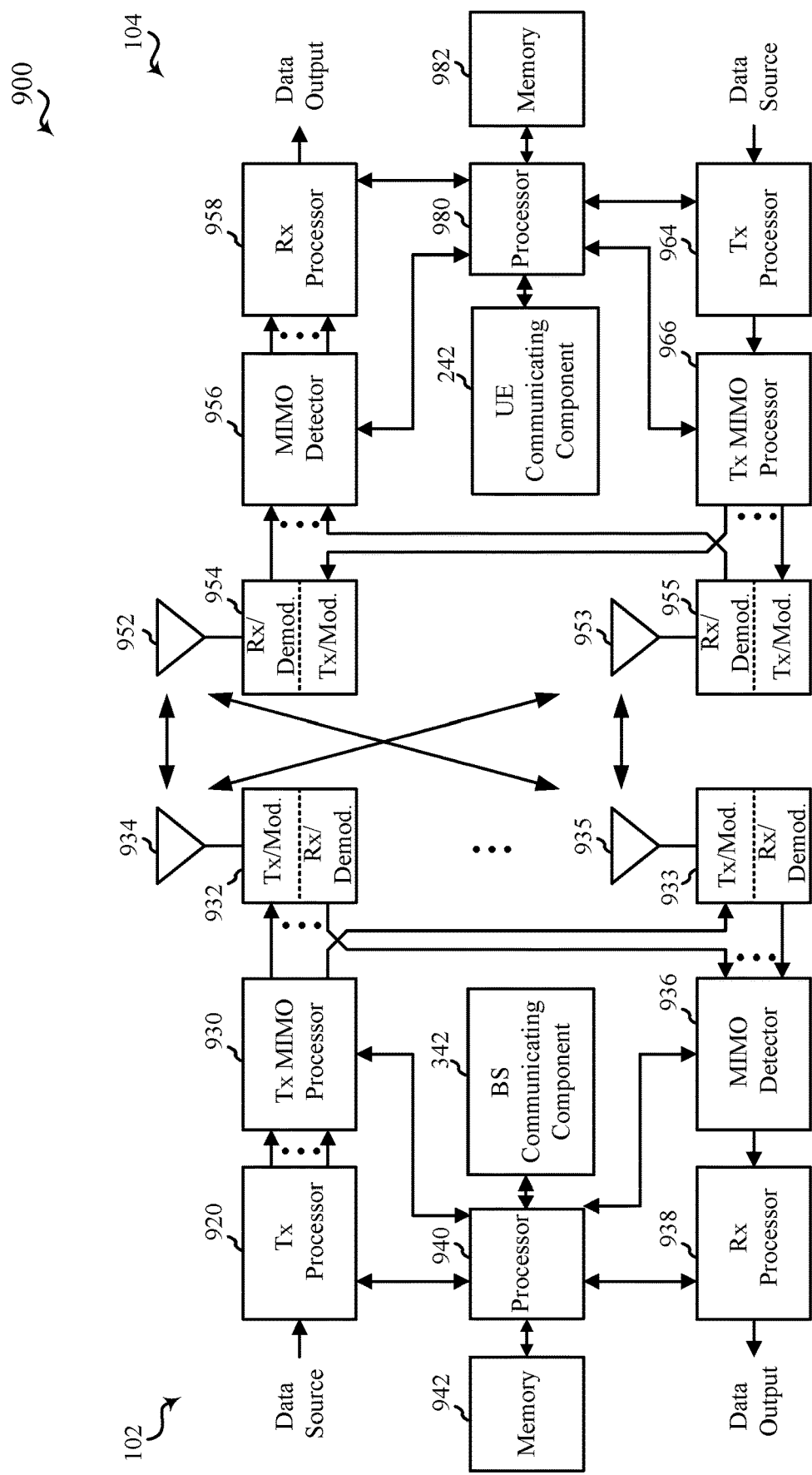
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

Figure 10:
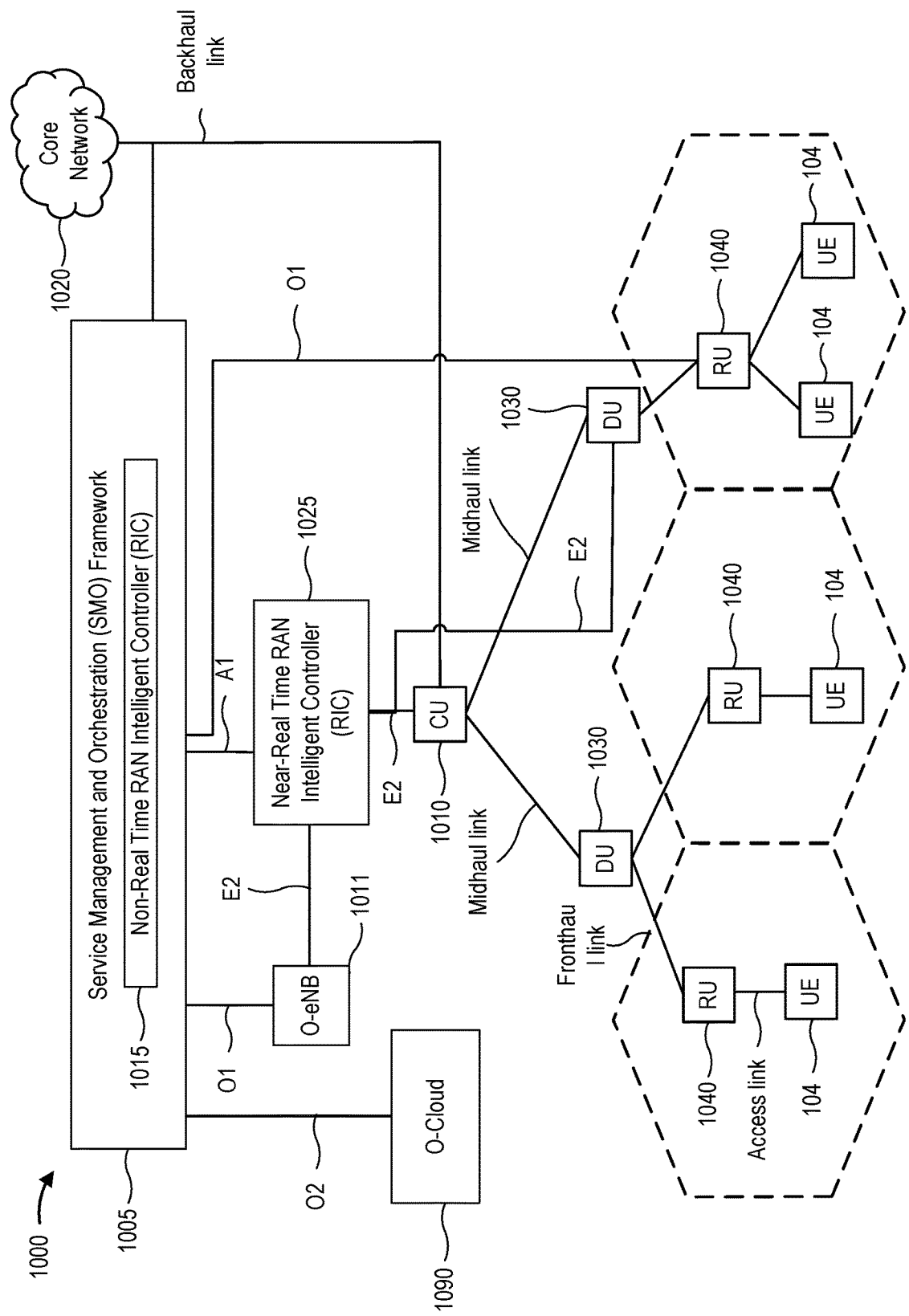
FIG. 10 is a diagram illustrating an example of disaggregated base station architecture, in accordance with various aspects of the present disclosure.

FIG. 10 shows a diagram illustrating an example of disaggregated base station 1000 architecture. The disaggregated base station 1000 architecture may include one or more central units (CUs) 1010 that can communicate directly with a core network 1020 via a backhaul link, or indirectly with the core network 1020 through one or more disaggregated base station units (such as a Near-Real Time (Near-RT) RAN Intelligent Controller (MC) 1025 via an E2 link, or a Non-Real Time (Non-RT) MC 1015 associated with a Service Management and Orchestration (SMO) Framework 1005, or both). A CU 1010 may communicate with one or more distributed units (DUs) 1030 via respective midhaul links, such as an F1 interface. The DUs 1030 may communicate with one or more radio units (RUs) 1040 via respective fronthaul links. The RUs 1040 may communicate with respective UEs 104 via one or more radio frequency (RF) access links. In some implementations, the UE 104 may be simultaneously served by multiple RUs 1040.

Each of the units, e.g., the CUs 1010, the DUs 1030, the RUs 1040, as well as the Near-RT RICs 1025, the Non-RT RICs 1015 and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (i.e., Central Unit-User Plane (CU-UP)), control plane functionality (i.e., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 1030 may further host one or more low PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 104. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via O1) or via creation of RAN management policies (such as A1 policies).

In accordance with aspects described herein, a base station 102 can include a monolithic base station, a disaggregated base station, and/or one or more components of a disaggregated base station, such as a CU, DU, or RU. As such, for example, one or more of a monolithic base station, a disaggregated base station, and/or one or more components of a disaggregated base station, such as a CU, DU, and/or RU can include the components of FIG. 3 and/or can be configured to perform the functions of method 800 in FIG. 8, etc.

The following aspects are illustrative only and aspects thereof may be combined with aspects of other embodiments or teaching described herein, without limitation.

Aspect 1 is a method for wireless communication including receiving, from a network node, a first transmission for configuring a configured grant, where the configured grant allocates one or more resources associated with an uplink transmission process having a transmission process identifier, obtaining a first indication that the network node uses a fallback DCI format, and modifying, based at least in part on obtaining the first indication and the transmission process identifier, the uplink transmission process.

In Aspect 2, the method of Aspect 1 includes where obtaining the first indication is based at least in part on receiving at least a configured number of fallback DCIs from the network node.

In Aspect 3, the method of Aspect 2 includes where obtaining the first indication is based at least in part on consecutively receiving at least a configured number of fallback DCI from the network node without receiving a non-fallback DCI.

In Aspect 4, the method of any of Aspects 1 to 3 includes where obtaining the first indication is based at least in part on receiving a new configuration for the uplink transmission process from the network node.

In Aspect 5, the method of Aspect 4 includes where the new configuration is a new RRC configuration.

In Aspect 6, the method of any of Aspects 1 to 5 includes where obtaining the first indication includes receiving the first indication in signaling from the network node.

In Aspect 7, the method of Aspect 6 includes where the signaling from the network node also indicates a time duration for using the fallback DCI format, where modifying the uplink transmission process is based at least in part on the time duration.

In Aspect 8, the method of any of Aspects 6 or 7 includes where the signaling from the network node indicates one or more parameters for modifying the uplink transmission process, where modifying the uplink transmission process is based at least in part on the one or more parameters.

In Aspect 9, the method of Aspect 8 includes where the one or more parameters includes a parameter indicating to transmit a new transmission for each of the one or more resources associated with the uplink transmission process.

In Aspect 10, the method of any of Aspects 8 or 9 includes where the one or more parameters includes a parameter indicating to transmit a retransmission in at least one of the one or more resources allocated by the configured grant and associated with the uplink transmission process while a configured grant timer associated with the uplink transmission process is running.

In Aspect 11, the method of any of Aspects 8 to 10 includes where the one or more parameters includes a parameter indicating to transmit a new transmission and one or more blind retransmissions over a number of the one or more resources associated with the uplink transmission process for the uplink transmission process.

In Aspect 12, the method of any of Aspects 1 to 11 includes where modifying the uplink transmission process includes disabling or suspending a configured grant timer associated with the uplink transmission process based at least in part on obtaining the first indication, and transmitting a new transmission over each of the one or more resources associated with the uplink transmission process while the configured grant timer is disabled or suspended.

In Aspect 13, the method of any of Aspects 1 to 12 includes where modifying the uplink transmission process includes transmitting a retransmission over at least one resource of the one or more resources associated with the uplink transmission process while a configured grant timer associated with the uplink transmission process is running.

In Aspect 14, the method of any of Aspects 1 to 13 includes where modifying the uplink transmission process includes transmitting a new transmission or a retransmission over at least one resource of the one of more resources associated with the uplink transmission process based at least in part on a QoS parameter of a logical channel, where data of the logical channel can be multiplexed to the uplink transmission process.

In Aspect 15, the method of any of Aspects 1 to 14 includes where modifying the uplink transmission process includes transmitting a new transmission or a retransmission for the uplink transmission process over at least one resource of the one or more resources associated with the uplink transmission process while a configured grant timer associated with the uplink transmission process is running and where a dynamic grant for another transmission process identifier is received, where a difference between the another transmission process identifier and the transmission process identifier is equal to a configured value, and where the dynamic grant indicates the at least one resource.

In Aspect 16, the method of any of Aspects 1 to 15 includes reverting the modifying of the uplink transmission process, based at least in part on obtaining a second indication.

In Aspect 17, the method of Aspect 16 includes where reverting the uplink transmission process includes enabling or resuming a configured grant timer disabled or suspended as part of modifying the uplink transmission process.

In Aspect 18, the method of any of Aspects 16 or 17 includes where obtaining the second indication is based at least in part on receiving at least a configured number of non-fallback DCI formats from the network node.

In Aspect 19, the method of any of Aspects 16 to 18 includes where obtaining the second indication includes obtaining, from the first indication, a time duration for applying the fallback DCI format.

In Aspect 20, the method of any of Aspects 16 to 19 includes where obtaining the second indication is based at least in part on receiving the second indication in signaling from the network node.

In Aspect 21, the method of any of Aspects 1 to 20 include where modifying the uplink transmission process is based at least in part on the transmission process identifier exceeding a threshold.

Aspect 22 is a method for wireless communication including transmitting a first transmission for configuring a configured grant, where the configured grant allocates one or more resources associated with an uplink transmission process having a transmission process identifier, transmitting a first indication of using a fallback DCI format, and receiving based at least in part on transmitting the first indication, and based at least in part on the transmission process identifier, one or more uplink transmissions according to modifying the uplink transmission process.

In Aspect 23, the method of Aspect 22 includes where transmitting the first indication is based at least in part on transmitting at least a configured number of fallback DCIs.

In Aspect 24, the method of any of Aspects 22 or 23 includes where transmitting the first indication is based at least in part on consecutively transmitting at least a configured number of fallback DCIs without transmitting a non-fallback DCI.

In Aspect 25, the method of any of Aspects 22 to 24 includes where transmitting the first indication is based at least in part on transmitting a new configuration for modifying the uplink transmission process.

In Aspect 26, the method of Aspect 25 includes where the new configuration is a new RRC configuration.

In Aspect 27, the method of any of Aspects 22 to 26 includes where the first indication also indicates a time duration for using the fallback DCI, where receiving the one or more uplink transmissions is based at least in part on the time duration.

In Aspect 28, the method of any of Aspects 22 to 27 includes where the first indication also indicates one or more parameters for modifying the uplink transmission process, and where receiving the one or more uplink transmissions is based at least in part on the one or more parameters.

In Aspect 29, the method of Aspect 28 includes where the one or more parameters includes a parameter indicating to transmit a new transmission for each of the one or more resources associated with the uplink transmission process.

In Aspect 30, the method of any of Aspects 28 or 29 includes where the one or more parameters includes a parameter indicating to transmit a retransmission in at least one of the one or more resources allocated by the configured grant and associated with the uplink transmission process while a configured grant timer associated with the uplink transmission process is running.

In Aspect 31, the method of any of Aspects 28 to 30 includes where the one or more parameters includes a parameter indicating to transmit a new transmission and one or more blind retransmissions over a number of the one or more resources associated with the uplink transmission process for the uplink transmission process.

In Aspect 32, the method of any of Aspects 22 to 31 includes where receiving the one or more uplink transmissions includes receiving a new transmission over each of the one or more resources associated with the uplink transmission process regardless of a configured grant timer associated with the uplink transmission process.

In Aspect 33, the method of any of Aspects 22 to 32 includes where receiving the one or more uplink transmissions includes receiving a retransmission over at least one resource of the one or more resources associated with the uplink transmission process while a configured grant timer associated with the uplink transmission process is running.

In Aspect 34, the method of any of Aspects 22 to 33 includes where receiving the one or more uplink transmissions includes receiving a new transmission or a retransmission over at least one resource of the one of more resources associated with the uplink transmission process based at least in part on a QoS parameter of a logical channel, where data of the logical channel can be multiplexed to the uplink transmission process.

In Aspect 35, the method of any of Aspects 22 to 34 includes where receiving the one or more uplink transmissions includes receiving a new transmission or a retransmission for the uplink transmission process over at least one resource of the one or more resources associated with the uplink transmission process while a configured grant timer associated with the uplink transmission process is running and where a dynamic grant for another transmission process identifier is transmitted, where a difference between the another transmission process identifier and the transmission process identifier is equal to a configured value, and where the dynamic grant that indicates the at least one resource.

In Aspect 36, the method of any of Aspects 22 to 35 includes transmitting a second indication to revert the modifying of the uplink transmission process.

In Aspect 37, the method of Aspect 36 includes where transmitting the second indication is based at least in part on transmitting at least a configured number of non-fallback DCIs.

In Aspect 38, the method of any of Aspects 36 or 37 includes where the second indication includes a time duration for applying the fallback DCI specified in the first indication.

In Aspect 39, the method of any of Aspects 22 to 38 includes where modifying the uplink transmission process is based at least in part on the transmission process identifier exceeding a threshold.

Aspect 40 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 39.

Aspect 41 is an apparatus for wireless communication including means for performing any of the methods of Aspects 1 to 39.

Aspect 42 is a computer-readable medium including code executable by one or more processors for wireless communications, the code including code for performing any of the methods of Aspects 1 to 39.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the transceiver and the memory, wherein the one or more processors are configured to:
receive, from a network node, a first transmission for configuring a configured grant, wherein the configured grant allocates one or more resources associated with an uplink transmission process having a transmission process identifier;
obtain a first indication that the network node uses a fallback downlink control information (DCI) format; and
modify, based at least in part on obtaining the first indication and based at least in part on the transmission process identifier exceeding a threshold, the uplink transmission process.

2. The apparatus of claim 1, wherein the one or more processors are configured to obtain the first indication based at least in part on receiving at least a configured number of fallback DCIs from the network node.

3. The apparatus of claim 2, wherein the one or more processors are configured to obtain the first indication based at least in part on consecutively receiving at least a configured number of fallback DCI from the network node without receiving a non-fallback DCI.

4. The apparatus of claim 1, wherein the one or more processors are configured to obtain the first indication based at least in part on receiving a new configuration for the uplink transmission process from the network node.

5. The apparatus of claim 4, wherein the new configuration is a new radio resource control (RRC) configuration.

6. The apparatus of claim 1, wherein the one or more processors are configured to obtain the first indication at least in part by receiving the first indication in signaling from the network node.

7. The apparatus of claim 6, wherein the signaling from the network node also indicates a time duration for using the fallback DCI format, wherein the one or more processors are configured to modify the uplink transmission process based at least in part on the time duration.

8. The apparatus of claim 6, wherein the signaling from the network node indicates one or more parameters for modifying the uplink transmission process, wherein the one or more processors are configured to modify the uplink transmission process based at least in part on the one or more parameters.

9. The apparatus of claim 8, wherein the one or more parameters includes a parameter indicating to transmit a new transmission for each of the one or more resources associated with the uplink transmission process.

10. The apparatus of claim 8, wherein the one or more parameters includes a parameter indicating to transmit a retransmission in at least one of the one or more resources allocated by the configured grant and associated with the uplink transmission process while a configured grant timer associated with the uplink transmission process is running.

11. The apparatus of claim 8, wherein the one or more parameters includes a parameter indicating to transmit a new transmission and one or more blind retransmissions over a number of the one or more resources associated with the uplink transmission process for the uplink transmission process.

12. The apparatus of claim 1, wherein the one or more processors are configured to modify the uplink transmission process at least in part by:
disabling or suspending a configured grant timer associated with the uplink transmission process based at least in part on obtaining the first indication; and
transmitting a new transmission over each of the one or more resources associated with the uplink transmission process while the configured grant timer is disabled or suspended.

13. The apparatus of claim 1, wherein the one or more processors are configured to modify the uplink transmission process at least in part by transmitting a retransmission over at least one resource of the one or more resources associated with the uplink transmission process while a configured grant timer associated with the uplink transmission process is running.

14. The apparatus of claim 1, wherein the one or more processors are configured to modify the uplink transmission process at least in part by transmitting a new transmission or a retransmission over at least one resource of the one or more resources associated with the uplink transmission process based at least in part on a quality-of-service (QOS) parameter of a logical channel, wherein data of the logical channel can be multiplexed to the uplink transmission process.

15. The apparatus of claim 1, wherein the one or more processors are configured to modify the uplink transmission process at least in part by transmitting a new transmission or a retransmission for the uplink transmission process over at least one resource of the one or more resources associated with the uplink transmission process while a configured grant timer associated with the uplink transmission process is running and where a dynamic grant for another transmission process identifier is received, wherein a difference between the another transmission process identifier and the transmission process identifier is equal to a configured value, and wherein the dynamic grant indicates the at least one resource.

16. The apparatus of claim 1, wherein the one or more processors are configured further to revert the modifying of the uplink transmission process, based at least in part on obtaining a second indication.

17. The apparatus of claim 16, wherein the one or more processors are configured to revert the uplink transmission process at least in part by enabling or resuming a configured grant timer disabled or suspended as part of modifying the uplink transmission process.

18. The apparatus of claim 16, wherein the one or more processors are configured to obtain the second indication based at least in part on receiving at least a configured number of non-fallback DCI formats from the network node.

19. The apparatus of claim 16, wherein the one or more processors are configured to obtain the second indication at least in part by obtaining, from the first indication, a time duration for applying the fallback DCI format.

20. The apparatus of claim 16, wherein the one or more processors are configured to obtain the second indication based at least in part on receiving the second indication in signaling from the network node.

21. An apparatus for wireless communication, comprising:
a transceiver;
a memory configured to store instructions; and
one or more processors communicatively coupled with the transceiver and the memory, wherein the one or more processors are configured to:
transmit a first transmission for configuring a configured grant, wherein the configured grant allocates one or more resources associated with an uplink transmission process having a transmission process identifier;
transmit a first indication of using a fallback downlink control information (DCI) format; and
receive based at least in part on transmitting the first indication, and based at least in part on the transmission process identifier exceeding a threshold, one or more uplink transmissions according to modifying the uplink transmission process.

22. The apparatus of claim 21, wherein the one or more processors are configured to transmit the first indication based at least in part on at least one of transmitting at least a configured number of fallback DCIs, consecutively transmitting at least a configured number of fallback DCIs without transmitting a non-fallback DCI, or transmitting a new configuration for modifying the uplink transmission process.

23. The apparatus of claim 21, wherein the first indication also indicates a time duration for using the fallback DCI, wherein the one or more processors are configured to receive the one or more uplink transmissions based at least in part on the time duration.

24. The apparatus of claim 21, wherein the first indication also indicates one or more parameters for modifying the uplink transmission process, and wherein the one or more processors are configured to receive the one or more uplink transmissions based at least in part on the one or more parameters.

25. The apparatus of claim 21, wherein the one or more processors are configured to receive the one or more uplink transmissions at least in part by receiving a new transmission over each of the one or more resources associated with the uplink transmission process regardless of a configured grant timer associated with the uplink transmission process.

26. A method for wireless communication, comprising:
receiving, from a network node, a first transmission for configuring a configured grant, wherein the configured grant allocates one or more resources associated with an uplink transmission process having a transmission process identifier;
obtaining a first indication that the network node uses a fallback downlink control information (DCI) format; and modifying, based at least in part on obtaining the first indication and based at least in part on the transmission process identifier exceeding a threshold, the uplink transmission process.

27. The method of claim 26, wherein obtaining the first indication is based at least in part on receiving at least a configured number of fallback DCIs from the network node.

28. A method for wireless communication, comprising:
transmitting a first transmission for configuring a configured grant, wherein the configured grant allocates one or more resources associated with an uplink transmission process having a transmission process identifier;
transmitting a first indication of using a fallback downlink control information (DCI) format; and
receiving based at least in part on transmitting the first indication, and based at least in part on the transmission process identifier exceeding a threshold, one or more uplink transmissions according to modifying the uplink transmission process.

29. The method of claim 28, wherein transmitting the first indication is based at least in part on transmitting at least a configured number of fallback DCIs.

\* \* \* \* \*